(12) United States Patent
Hiratsuka et al.

(10) Patent No.: US 9,568,787 B2
(45) Date of Patent: Feb. 14, 2017

(54) LIQUID CRYSTAL DISPLAY

(71) Applicant: Japan Display Inc., Tokyo (JP)

(72) Inventors: Takato Hiratsuka, Tokyo (JP); Osamu Itou, Tokyo (JP); Daisuke Sonoda, Tokyo (JP); Toshimasa Ishigaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 97 days.

(21) Appl. No.: 14/490,717

(22) Filed: Sep. 19, 2014

(65) Prior Publication Data

US 2015/0085232 A1     Mar. 26, 2015

(30) Foreign Application Priority Data

Sep. 20, 2013  (JP) ................................ 2013-195910

(51) Int. Cl.
  *G02F 1/1333*  (2006.01)
  *G02F 1/1337*  (2006.01)
  *G02F 1/1343*  (2006.01)

(52) U.S. Cl.
  CPC ... *G02F 1/134363* (2013.01); *G02F 1/133377* (2013.01); *G02F 1/133707* (2013.01); *G02F 2001/133776* (2013.01)

(58) Field of Classification Search
  CPC ............................................... G02F 1/133377
  See application file for complete search history.

(56) References Cited

U.S. PATENT DOCUMENTS

| | | | | |
|---|---|---|---|---|
| 6,266,122 B1* | 7/2001 | Kishimoto | ........ | G02F 1/133377 349/156 |
| 2006/0215100 A1* | 9/2006 | Ito | ..................... | G02F 1/134363 349/141 |
| 2009/0284707 A1* | 11/2009 | Cho | .................. | G02F 1/134363 349/160 |

FOREIGN PATENT DOCUMENTS

JP            6-214244 A        8/1994

* cited by examiner

*Primary Examiner* — Nathanael R Briggs
*Assistant Examiner* — Alexander Gross
(74) *Attorney, Agent, or Firm* — Typha IP LLC

(57) ABSTRACT

Pixel electrodes and a common electrode are formed on a first panel. A wall is formed on the first panel. The wall includes a large insulating wall that is made of an insulating material and projects toward a second panel, and a wall electrode part that covers a side wall of the large insulating wall and functions as the pixel electrode or the common electrode. The wall includes a side surface on which an alignment film that defines an alignment of liquid crystal molecules of a liquid crystal layer is formed. The side wall of the wall is inclined with respect to a direction perpendicular to the first panel and the second panel. With this configuration, in a liquid crystal display device having the wall electrode, light leakage at the time of displaying a black image can be reduced.

7 Claims, 14 Drawing Sheets

LIQUID CRYSTAL DISPLAY

CROSS-REFERENCE TO RELATED APPLICATION

The present application claims priority from Japanese application JP2013-195910 filed on Sep. 20, 2013, the content of which is hereby incorporated by reference into this application.

BACKGROUND OF THE INVENTION

1. Field of the Invention

The present invention relates to a liquid crystal display device of an IPS (in-plan switching) system.

2. Description of the Related Art

For example, As shown in JPH06-214244 A, there are liquid crystal display devices of the IPS system where a wall-shaped insulating part is formed in a boundary between two adjacent pixels and an electrode (hereinafter referred to as "wall electrode") is formed on each side surface of the wall-shaped insulating part (hereinafter, a portion including the wall-shaped insulating part and the wall electrodes is called "wall"). Each of the pixels includes two opposed wall electrodes. In an example, one wall electrode functions as a pixel electrode, and the other wall electrode functions as a common electrode. When a voltage corresponding to a gradation value of each pixel is applied to the pixel electrode, a horizontal electric field is developed between the pixel electrode and the common electrode. Liquid crystal molecules rotate due to the electric field, and thus a light of a backlight unit is allowed to transmit through a liquid crystal layer.

SUMMARY OF THE INVENTION

In most of the liquid crystal display devices, an initial alignment of liquid crystal molecules is inclined by an alignment film by 5 to 10 degrees. When the liquid crystal molecules are arranged in the initial alignment, the light of the backlight unit is blocked by the liquid crystal layer to display a black image. However, since the liquid crystal molecules close to side surfaces of the wall are arranged along the side surface of the wall, the liquid crystal molecules are not arranged in the initial alignment. For that reason, the light is leaked at the time of displaying the black image, and a contrast ratio between the black image and a white image becomes small.

One object of the present invention is to reduce a light leakage at the time of displaying the black image in a liquid crystal display device having wall electrodes.

(1) According to the present invention, there is provided a liquid crystal display device, including: a first panel having pixel electrodes disposed in a plurality of pixels respectively, and a common electrode; a second panel facing the first panel and having a black matrix which partitions two adjacent pixels; a liquid crystal layer disposed between the first panel and the second panel; and a wall including. The wall includes an insulating wall made of an insulating material, formed in the first panel, and located in a boundary between the two adjacent pixels, a wall electrode which covers a side surface of the insulating wall and functions as the pixel electrode or the common electrode, and an alignment film formed on a side surface of the wall and covering the wall electrode, the alignment film defining an alignment of liquid crystal molecules included in the liquid crystal layer. The side surface of the wall on which the alignment film is formed is inclined with respect to a direction perpendicular to the first panel and the second panel. According to the present invention, a light leakage at the time of displaying a black image can be suppressed.

(2) In the item (1), the wall may include a side insulating part made of an insulating material and covering the wall electrode. Further, a surface of the side insulating part may be inclined with respect to the direction perpendicular to the first panel and the second panel, and the alignment film may be formed on the surface of the side insulating part. According to this configuration, it is relatively easy to form the wall having the inclined slope surface.

(3) In the item (1) or (2), an angle formed between the side surfaces of the wall having the alignment film formed thereon, and a substrate of the first panel may be smaller than an angle formed between the substrate of the first panel and the side surface of the insulating wall. According to this configuration, the light leakage at the time of displaying the black image can be suppressed.

(4) In any one of the items (1) to (3), the side surface of the insulating wall may be inclined with respect to the direction perpendicular to the first panel and the second panel. According to this configuration, it is relatively easy to form the wall having the inclined slope surface.

(5) In any one of the items (1) to (4), the wall may include a lower part which is a portion in the wall located toward the substrate of the first panel, and the lower part of the wall may have a width larger than a width of a line of the black matrix. According to this configuration, since the wall having the side surface small in the inclination angle is realized, the light leakage can be more effectively suppressed.

(6) In any one of the items (1) to (5), the insulating material of the side insulating part may be connected from one of the two adjacent pixels to the other through an upper surface of the wall. According to this configuration, the number of processes at the time of manufacturing can be reduced.

(7) In any one of the items (1) to (6), the first panel may include, as the insulating wall, two large insulating walls facing each other across one pixel, and the first panel may include a small insulating wall that is formed between the two large insulating walls and is lower in height than the two large insulating walls, one of the pixel electrode and the common electrode may cover the side surfaces of the large insulating walls as the wall electrode, and the other of the pixel electrode and the common electrode may be formed on the small insulating wall.

(8) In any one of the items (1) to (6), one of the pixel electrode and the common electrode may cover the side surface of one of the two insulating walls that face each other, and the other of the pixel electrode and the common electrode may cover the side surface of the other of the two insulating walls.

BRIEF DESCRIPTION OF THE DRAWINGS

FIGS. 4A-1, 4A-2, 4B-1, and 4B-2 are diagrams illustrating an arrangement of liquid crystal molecules when a black image is displayed;

DETAILED DESCRIPTION OF THE INVENTION

Figure 1:
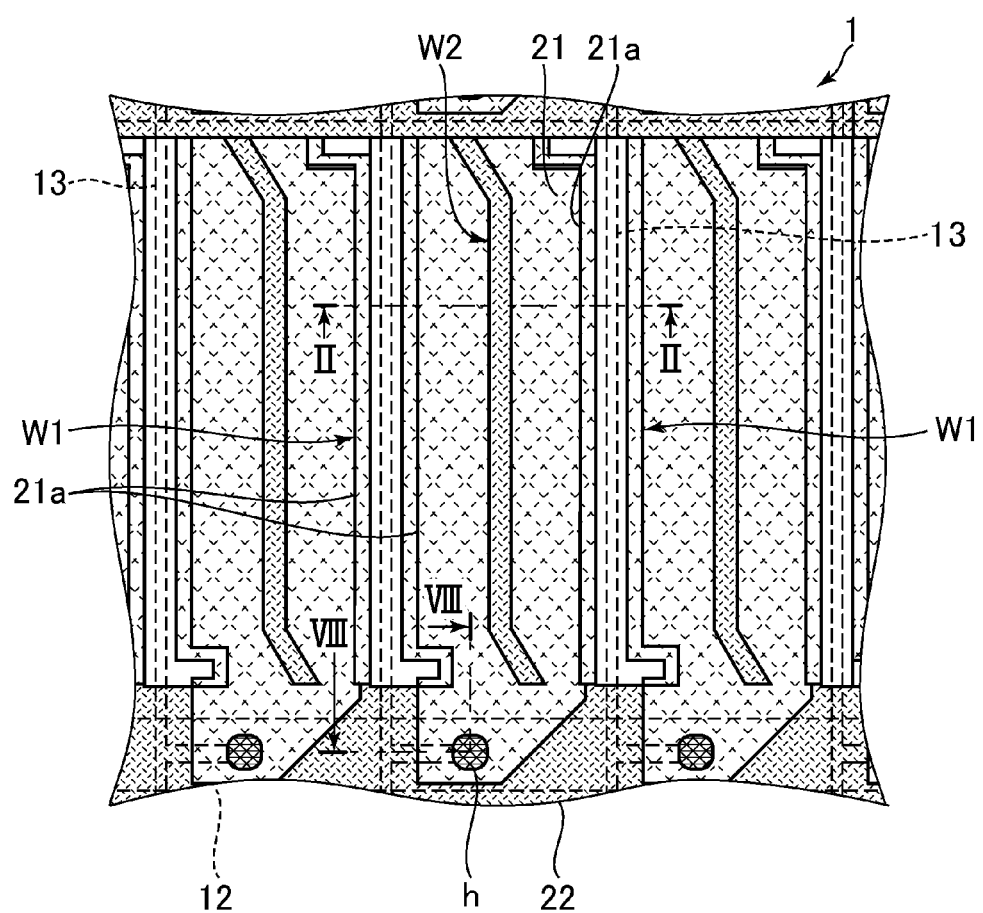
FIG. 1 is a plan view of a first panel provided in a liquid crystal display device according to the present invention.
Figure 2:
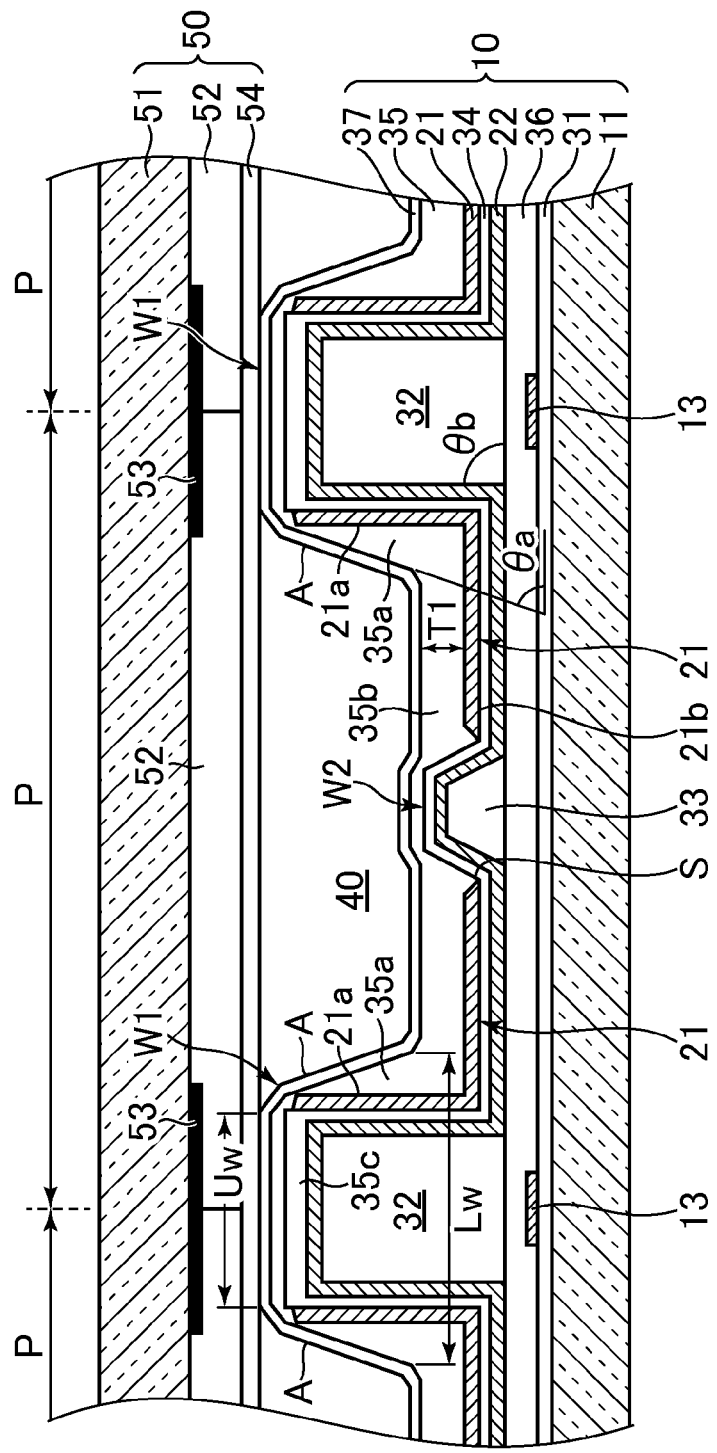
FIG. 2 is a cross-sectional view of the liquid crystal display device taken along a line II-II illustrated in FIG. 1.
Figure 3:
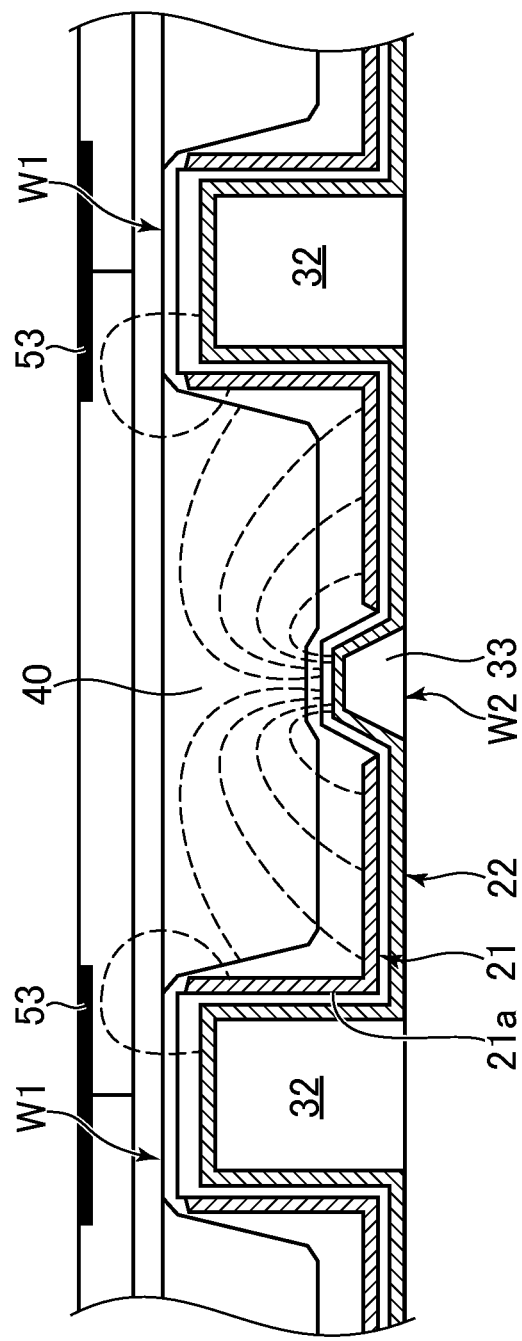
FIG. 3 is a diagram illustrating an electric field developed in the liquid crystal display device.

Hereinafter, embodiments of the present invention will be described with reference to the accompanying drawings below. FIG. 1 is a plan view of a first panel 10 provided in a liquid crystal display device according to the present invention. FIG. 2 is a cross-sectional view of the liquid crystal display device 1 taken along a line II-II illustrated in FIG. 1. FIG. 3 is a diagram illustrating an electric field developed in the liquid crystal display device 1. Dashed lines in FIG. 3 are electric lines of force.

As illustrated in FIG. 2, a liquid crystal display device 1 includes a first panel 10 and a second panel 50 that face each other. The first panel 10 is a TFT panel on which thin film transistors T (refer to FIG. 8), which will be described later, is formed, and the second panel 50 is a color filter panel on which color filters 52 are formed. A liquid crystal layer 40 is disposed between the first panel 10 and the second panel 50. A polarization plate is arranged on each of a back side of the first panel 10 opposite to the second panel 50, and a front side of the second panel 50 opposite to the first panel 10. The back side of the first panel 10 opposite to the second panel 50 is irradiated with light from a backlight unit not shown.

As illustrated in FIG. 2, the second panel 50 has a substrate 51. The substrate 51 is made of a transparent material such as glass or resin. The second panel 50 includes the color filters 52 in the respective pixels. An area indicated by P in FIG. 2 represents one pixel. The second panel 50 includes a black matrix 53. The black matrix 53 partitions two adjacent pixels. An overcoat layer 54 is formed on the color filters 52, that is, on a surface of the color filters 52 toward the liquid crystal layer 40.

As illustrated in FIG. 1, the first panel 10 includes plural drain electrode lines 13, and plural gate electrode lines 12 that intersect with the drain electrode lines 13. Each of the pixels is surrounded by the two adjacent drain electrode lines 13, and the two adjacent gate electrode lines 12. A voltage (gradation voltage) corresponding to a gradation value of each pixel is applied to the drain electrode lines 13. A gate voltage for turning on the thin film transistors T is applied to the gate electrode lines 12. As illustrated in FIG. 2, the first panel 10 includes a substrate 11. As with the substrate 51 of the second panel 50, the substrate 11 is made of a transparent material such as glass or resin. The gate electrode lines 12 illustrated in FIG. 1 are formed on the substrate 11, and covered with an insulating film 31 (refer to FIG. 2). The drain electrode lines 13 are formed on the insulating film 31, and also covered with an insulating film 36 which is formed on the insulating film 31.

As illustrated in FIG. 2, the first panel 10 includes large walls W1 each of which is located in a boundary portion of the two adjacent pixels, and projected toward the second panel 50. The large walls W1 are formed along the drain electrode lines 13. The black matrix 53 of the second panel 50 is located above the large walls W1. The large walls W1 each include a large insulating wall 32 made of an insulating material. The large insulating walls 32 are disposed on the insulating film 36.

The first panel 10 in the example illustrated in FIG. 2 has a small wall W2 in each of the pixels. The small walls W2 each have a small insulating wall 33 made of an insulating material, and projected toward the second panel 50. A height of the small insulating walls 33 is lower than that of the large insulating walls 32. The small insulating walls 33 are each located between the two large walls W1 that face each other across one pixel, and extend in a direction along the drain electrode lines 13. The small insulating walls 33 are also formed on the insulating film 36. The small insulating wall 33 is made of a transparent insulating material. Preferably, the large insulating walls 32 are also made of the same transparent insulating material as that of the small insulating walls 33. With this configuration, the number of processes in the manufacture can be reduced. A material of the large insulating walls 32 may not be always transparent.

As illustrated in FIG. 2, the first panel 10 includes pixel electrodes 21 in each of the pixels. The gradation voltage is applied to the pixel electrodes 21 through the drain electrode lines 13 and the thin film transistors T. Also, the first panel 10 includes a common electrode 22 disposed over the plural pixels. A common voltage is applied to the common electrode 22. The electrodes 21 and 22 are made of a transparent conductive material such as ITO (indium tin oxide) or AZO (aluminum doped zinc oxide).

As illustrated in FIG. 2, the common electrode 22 is formed on the insulating film 36, and covers the large insulating wall 32 and the small insulating wall 33. That is, parts of the common electrode 22 are formed on side surfaces and an upper surface (a surface facing the second panel 50) of the large insulating wall 32. Also, parts of the common electrode 22 are formed on side surfaces and an upper surface (a surface facing the second panel 50) of the small insulating wall 33.

The overall common electrode 22 is covered with an insulating film 34. That is, the insulating film 34 is formed over not only a portion (flat portion) between the walls W1 and W2, but also on the large walls W1 and the small wall W2 to cover portions of the common electrode 22 on the insulating walls 32 and 33.

Each of the pixel electrodes 21 includes a wall electrode part 21a covering a side surface of the large insulating wall 32, and configuring the large wall W1. The wall electrode parts 21a covers two side surfaces of the large insulating wall 32. Each of the pixels includes two wall electrode parts 21a that face each other across the small wall W2. Each of the pixel electrodes 21 includes, between lower edges (edges on the substrate 11 side) of the two wall electrode parts 21a, a horizontal electrode part 21b connected to the wall electrode part 21a. The horizontal electrode part 21b has a slit S formed therein. A portion of the common electrode 22 formed in the small wall W2 is projected toward the liquid crystal layer 40 through the slit S.

As illustrated in FIG. 3, a horizontal electric field is developed in the liquid crystal layer 40 due to a potential difference between the common electrode 22 and the pixel electrodes 21. Specifically, an electric field is developed between the common electrode 22 on the small wall W2, and the electrode parts 21a and 21b of the pixel electrodes 21. In particular, in the example of FIG. 2, the small insulating wall 33 is formed so that a width of the small insulating wall 33 is gradually reduced toward the second panel 50 (in this description, "width of the small insulating wall 33" is a width in a direction (lateral direction in the figure) along which the two wall electrode parts 21a face each other). A cross-section of the small insulating wall 33 is trapezoidal. As a result, as compared with a case in which the small insulating wall 33 has a rectangular cross-section, a vertical electric field developed above the small insulating wall 33 can be reduced. The small insulating wall 33 can be formed in manufacturing processes by diagonal exposure where a material of the small insulating wall 33, or a resist material for forming the small insulating wall 33 is diagonally irradiated with light. The shape of the small insulating wall 33 is not limited to that illustrated in FIG. 2. A cross-section of the small insulating wall 33 may be, for example, square or triangular.

The pixel electrodes 21 in the example of FIG. 2 each have no portion covering an upper surface of the large insulating wall 32. For that reason, the common electrode 22 is exposed between the two wall electrode parts 21a located on the side surfaces of the large insulating wall 32. As a result, an electric field is also developed between the upper portion of the wall electrode part 21a and the portion of the common electrode 22 which is formed on the upper surface of the large insulating wall 32.

In the example of FIG. 2, an edge of the slit S formed in the horizontal electrode part 21b of the pixel electrodes 21 is located at a lower edge of the side surface of the small wall W2. However, the pixel electrode 21 may include a portion (hereinafter referred to as "side electrode part") extending further toward the inside from the lower edge of the side surface of the small wall W2, and formed on the side surface of the small wall W2. In this structure, a fringe electric field is easily developed between the side surface electrode part and the common electrode 22 on the small wall W2.

As illustrated in FIG. 2, the first panel 10 includes an alignment film 37 defining an initial alignment of liquid crystal molecules and is in contact with the liquid crystal layer 40. The alignment film 37 includes a portion forming a side surface A of the large wall W1. The side surface A of the large wall W1 is inclined with respect to a direction perpendicular to the first panel 10 and the second panel 50 (hereinafter, the side surface A is called "inclined side surface"). A cross section of the large wall W1 is substantially trapezoidal, and the large wall W1 has two inclined side surfaces A that face opposite sides to each other. An interval (width of the large wall W1) between the two inclined side surfaces A gradually increases toward the substrate 11 of the first panel 10. Accordingly, a width Lw (width of a lower side of the trapezoid) of the lower portion of the large wall W1 is larger than a width Uw (width of the upper side of the trapezoid) of the upper surface of the large wall W1. In an example, the width Lw of the lower portion of the large wall W1 may be larger than twice of the width Uw of the upper surface of the large wall W1.

The width Uw of the upper surface of the large wall W1 is smaller than a width of line of the black matrix 53 whereas the width Lw of the lower surface of the large wall W1 is larger than the width of line of the black matrix 53 (the width of line of the black matrix 53 means a width of a portion located between two adjacent pixels). Therefore, the lower portion of the large wall W1 spreads rightward and leftward beyond the edge of the black matrix 53.

The first panel 10 includes an insulating film 35. The insulating film 35 includes a flat part 35b. The flat part 35b is located between the two large walls W1 and covers the horizontal electrode part 21b. The small wall W2 is embedded in the flat part 35b. That is, a thickness T1 of the flat part 35b is substantially equal to a height of the small wall W2. With this configuration, the thickness of the liquid crystal layer 40 on the upper side of the small wall W2 can be inhibited from being made smaller than a thickness of the liquid crystal layer 40 on other positions. The insulating film 35 includes a side surface part 35a (side insulating part) covering the wall electrode part 21a. The side surface of the large insulating wall 32, and the wall electrode part 21a of the pixel electrodes 21 are substantially vertical. The side surface part 35a of the insulating film 35 is formed so that the thickness of the side surface part 35a gradually increases toward the substrate 11, that is, toward the flat part 35b (in this description, "thickness" is a width in a direction in which the two large walls W1 face each other, that is, a width in a lateral direction in the FIG. 2). For that reason, the surface of the side surface part 35a is inclined with reference to a direction perpendicular to the first panel 10 and the second panel 50. The alignment film 37 is formed on a surface of the side surface part 35a, and configures the above-mentioned inclined side surfaces A.

An inclination angle of the surface of the side surface part 35a, that is, an inclination angle θa of the inclined side surfaces A is smaller than an angle θb of the side surface of the large insulating wall 32, and an angle of the wall electrode part 21a. In this example, "the inclination angle θa of the inclined side surfaces A" is an angle between a horizontal surface along the substrate 11, and the inclined side surfaces A. Also, "the angle θb of the side surface of the large insulating wall 32" is an angle between the horizontal surface along the substrate 11, and the side surface of the large insulating wall 32. The same is applied to "angle of the wall electrode part 21a".

The alignment film 37 of the inclined side surfaces A has, in a molecular chain of the alignment film 37, an anisotropy that defines the initial alignment of the liquid crystal molecules. The alignment film 37 is preferably formed through a photo-alignment method in which the alignment film 37 is irradiated with polarized ultraviolet rays. According to this method, the inclined side surfaces A can be also stably irradiated with the ultraviolet rays. As a result, as compared with a case in which the alignment film 37 is formed by a rubbing method, anisotropy of the molecular chains is easily provided to the alignment film 37 on the inclined side surfaces A. The method of forming the alignment film 37 is not limited to the photo-alignment method. For example, the alignment film 37 may be formed through the rubbing method.

Figure 4:
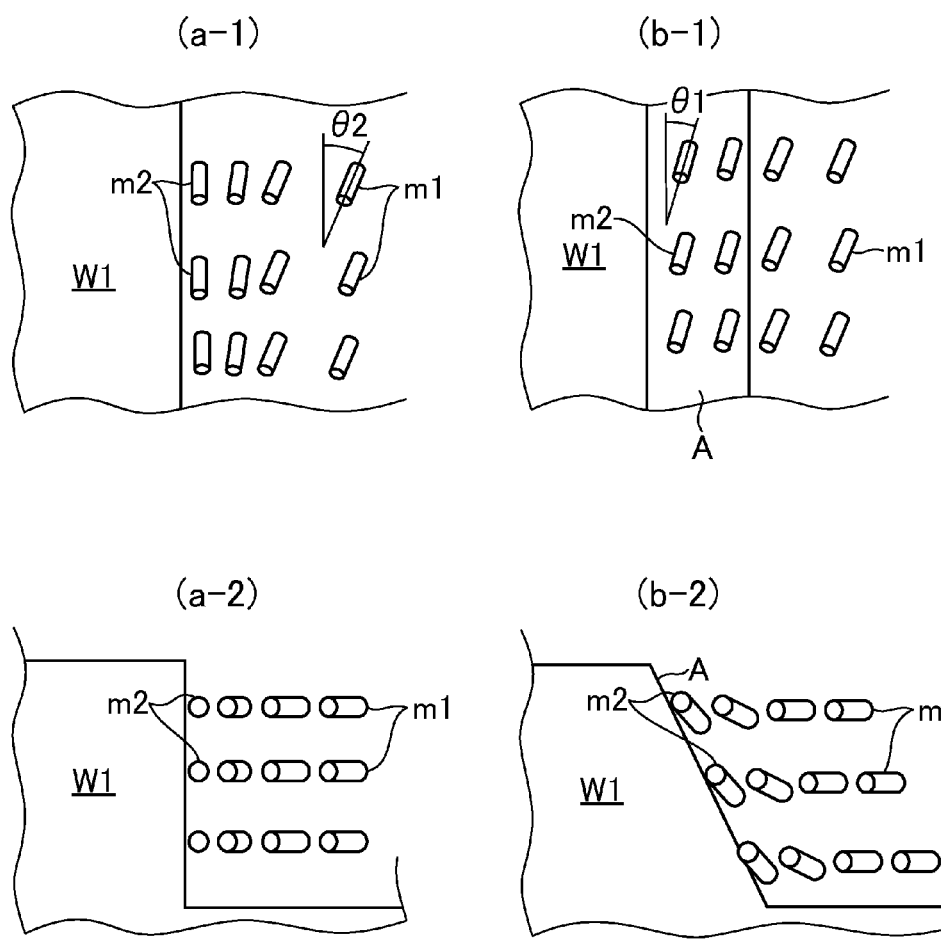

The light leakage when the liquid crystal display device displays a black image can be reduced by the inclined side surfaces A (the black image is displayed when the alignment of the liquid crystal molecules is the initial alignment). FIGS. 4A-1, 4A-2, 4B-1, and 4B-2 are diagrams illustrating an arrangement of the liquid crystal molecules when the black image is displayed. FIGS. 4A-1 and 4A-2 illustrate the arrangement of the liquid crystal molecules when the side surface of the large wall W1 is not inclined (when the large wall W1 has no inclined side surface A). FIG. 4A-1 illustrates a state in which the large wall W1 and the liquid crystal layer 40 are viewed from an upper side, and FIG. 4A-2 illustrates a cross-section thereof. FIGS. 4B-1 and 4B-2 illustrate the arrangement of the liquid crystal molecules when the large wall W1 has the inclined side surfaces A. FIG. 4B-1 illustrates a state in which the large wall W1 and the liquid crystal layer 40 are viewed from the upper side, and FIG. 4A-2 illustrates a cross-section thereof.

As illustrated in FIGS. 4A-1 and 4A-2, liquid crystal molecules m1 spaced away from a side surface of the large wall W1 are inclined by an angle θ1 in the initial alignment by the virtue of the alignment film 37 on the flat part 35$b$ (the angle θ1 is an angle to an absorption axis direction of the polarization plate arranged in the first panel 10). However, liquid crystal molecules m2 closer to the side surface of the large wall W1 are arranged along the side surface of the large wall W1, and an alignment of the liquid crystal molecules m2 is deviated from the angle θ1. As a result, at the time of displaying the black image, an optical retardation of the liquid crystal layer 40 is close to 0 at a position far from the side surface of the large wall W1, but the optical retardation is larger than 0 at a position closer to the side surface of the large wall W1. For that reason, the light leakage is generated in the vicinity of the side surface of the large wall W1.

As illustrated in FIGS. 4B-1 and 4B-2, also when the large wall W1 has the inclined side surface A, the liquid crystal molecules m2 closer to the inclined side surface A are arranged along the inclined side surface A. However, since the alignment film 37 of the inclined side surface A has anisotropy in the molecular chain configuring the alignment film 37, the liquid crystal molecules m2 closer to the inclined side surfaces A are also inclined at the angle θ2 in the initial alignment. With the above configuration, the optical retardation of the liquid crystal layer 40 in the vicinity of the large wall W1 can be closer to 0, and the light leakage can be reduced. Also, in a structure in which the large wall W1 has the inclined side surfaces A, as compared with the structure having no inclined side surface A, the thickness of the liquid crystal layer 40 in the vicinity of the large walls W1 becomes smaller (the thickness of the liquid crystal layer 40 is defined as a thickness in the direction perpendicular to the first plate 10). Also with a reduction in the thickness of the liquid crystal layer 40, the optical retardation of the liquid crystal layer 40 in the vicinity of the large wall W1 is closer to 0, and the light leakage is reduced.

The side surface part 35$a$ having the inclined surface can be formed, for example, as follows. A liquid solution which has relatively high viscosity is used as a material (for example, photosensitive resist material) of the insulating film 35. The liquid solution is coated on the first panel 10 in which the pixel electrodes 21, and layers below the pixel electrodes 21 has been formed. In this situation, since the viscosity of liquid solution is high, the surface of the side surface part 35$a$ becomes a slope surface. With the adjustment (reduction) of the percentage of solvent in the liquid solution, the liquid solution having a viscosity desirable to form the inclined side surfaces A can be obtained.

As illustrated in FIG. 2, the insulating film 35 is formed over the overall area of the plural pixels. That is, the insulating film 35 includes an upper surface part 35$c$. The upper surface part 35$c$ covers an upper side of the large insulating wall 32, and connects two side surface parts 35$a$ located on the opposite sides to each other across the large insulating wall 32. The flat part 35$b$ of the insulating film 35 covers the upper side of the small wall W2. According to this insulating film 35, a process of patterning the insulating film 35 is not required, and thus an increase in the manufacturing process can be suppressed.

Figure 5A:
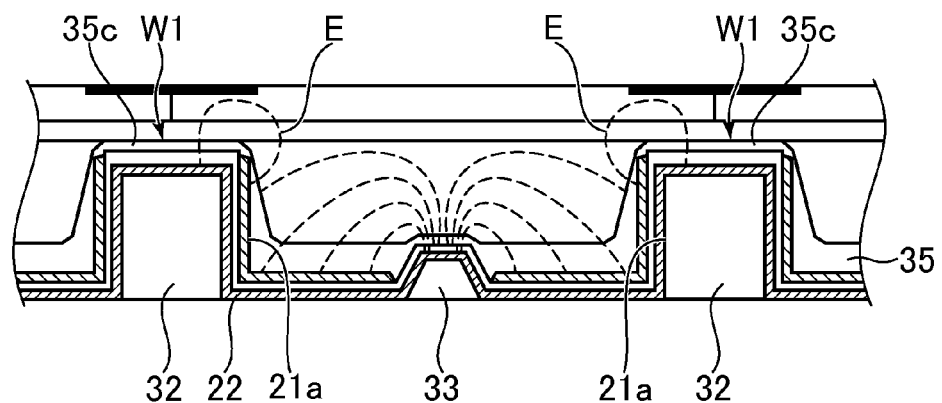
FIGS. 5A and 5B are diagrams illustrating an influence of a thickness of an insulating film formed on an upper side of a large wall on an electric field formed on a liquid crystal layer.
Figure 5B:
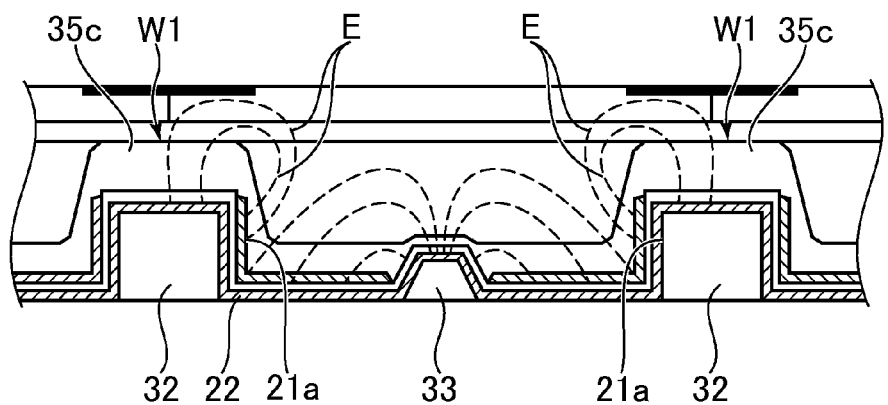

As illustrated in FIG. 2, the thickness of the upper surface part 35$c$ of the insulating film 35 is smaller than the thickness of the flat part 35$b$ of the insulating film 35. With this configuration, the horizontal electric field is liable to be formed in the liquid crystal layer 40. FIGS. 5A and 5B are diagrams illustrating an influence of the thickness of the upper surface part 35$c$ on an electric field developed on the liquid crystal layer 40. FIG. 5A is the same as FIG. 3A. The upper surface part 35$c$ of the first panel 10 illustrated in FIG. 5B has a thickness larger than that of the upper surface part 35$c$ of the first panel 10 illustrated in FIG. 5A. Since the thickness of the liquid crystal layer 40 is determined depending on the optical retardation required in the liquid crystal layer 40, the thickness of the liquid crystal layer 40 is kept constant in FIGS. 5A and 5B. For that reason, as illustrated in FIG. 5B, when the thickness of the upper surface part 35$c$ is larger, the height of the large wall W1 becomes smaller.

As illustrated in FIGS. 5A and 5B, a vertical electric field E is developed between the wall electrode part 21$a$, and the portion of the common electrode 22 above the large insulating wall 32. In the structure where the thickness of the upper surface part 35$c$ is larger, the vertical electric field E is liable to pass through the liquid crystal layer 40. In other words, when the upper surface part 35$c$ is thinned, the vertical electric field developed on the liquid crystal layer 40 can be reduced, and thus the transmittance of light at the time of displaying the white image can be increased. The viscosity of the liquid solution (concentration of the liquid solution) of the material of the insulating film 35 is adjusted so that the upper surface part 35$c$ thinner than the flat part 35$b$ can be obtained.

The portion of the insulating film 35 above the small wall W2 has a thickness smaller than a thickness T1 of the flat part 35$b$. As a result, the thickness of the liquid crystal layer 40 can be ensured on the upper side of the small wall W2. That is, the thickness of the liquid crystal layer 40 is easily uniformly kept between the two opposed large walls W1. As a result, the transmittance of the light at the time of displaying the white image can be inhibited from being reduced.

Figure 6:
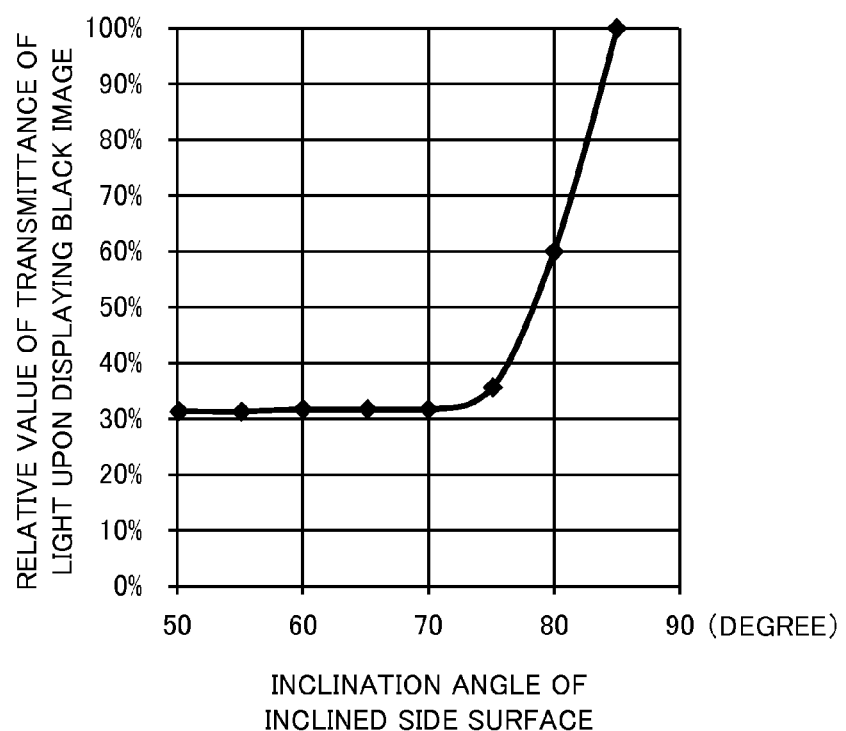
FIG. 6 is a graph illustrating a relationship between a relative value of the transmittance of light at the time of displaying a black image, and an inclination angle of an inclined side surface.

As described above, an inclination angle θa of the inclined side surfaces A can be changed by adjusting the percentage of the solvent added to the material of the insulating film 35. Plural samples different in the inclination angle θa are manufactured, and then the transmittance of light at the time of displaying the black image in the respective samples has been measured. The height of the wall is set to about 5 μm, and the thickness of the flat part 35$b$ is set to about 2 μm. FIG. 6 is a graph illustrating the measurement results. The axis of abscissa represents the inclination angle θa of the inclined side surface A. The axis of ordinate is a relative value of the light transmittance. The relative value of the light transmittance represents a relative magnitude of the light transmittance when it is assumed that the light transmittance in a structure where the inclination angle θa of the inclined side surfaces A is 85 degrees is 100%. The inclination angle θa is an angle formed between the inclined side surfaces A and the substrate 11. Specifically, θa is defined as an inclination angle of a portion in the outer surface of the large wall W1, where the portion has largest angel to the substrate 11 among portions in the outer surface of the large wall W1. The inclination angle θa is measured by cutting the samples, and observing the cross-sections by an SEM (scanning electron microscope). In all of the samples, the width of line of the black matrix 53 is set to 5 μm, and a width of the upper surface of the large walls W1 is set to 2 μm.

As illustrated in FIG. 6, in a range of the inclination angle θa from 85 degrees to 75 degrees, the relative value of the light transmittance becomes smaller as the inclination angle θa is smaller. When the inclination angle θa is 75 degrees, a relative value of the light transmittance is about 35%. In a range where the inclination angle θa is smaller than 75 degrees and larger than 70 degrees, the relative value of the light transmittance gradually reduces toward 30%. In a range where the inclination angle θa is equal to or lower than 70 degrees, the relative value of the light transmittance is kept substantially constant, and becomes about 30%. From the measurement result of FIG. 6, a preferable inclination angle θa is equal to or lower than 75 degrees. A more preferable inclination angle θa is equal to or lower than 70 degrees. That is, the preferable inclination angle θa is smaller than a degree (that is 75 degrees in FIG. 6) that is sum of the angle (70 degrees in FIG. 6) at which the relative value of the light transmittance becomes constant when the inclination angle gradually reduces and 5 degrees. A still more preferable inclination angle θa is smaller than the angle (70 degrees in FIG. 6) at which the relative value of the light transmittance becomes constant. Referring to FIG. 6, the reason why the relative value of light transmittance becomes substantially constant in the range of the inclination angle θa equal to or lower than 70 degrees is conceivably because a direction of the molecular chain of the alignment film 37 formed on the inclined side surface A substantially matches a direction of the molecular chain of the alignment film 37 formed on the flat part 35b in a plan view of the liquid crystal display device 1.

Figure 7:
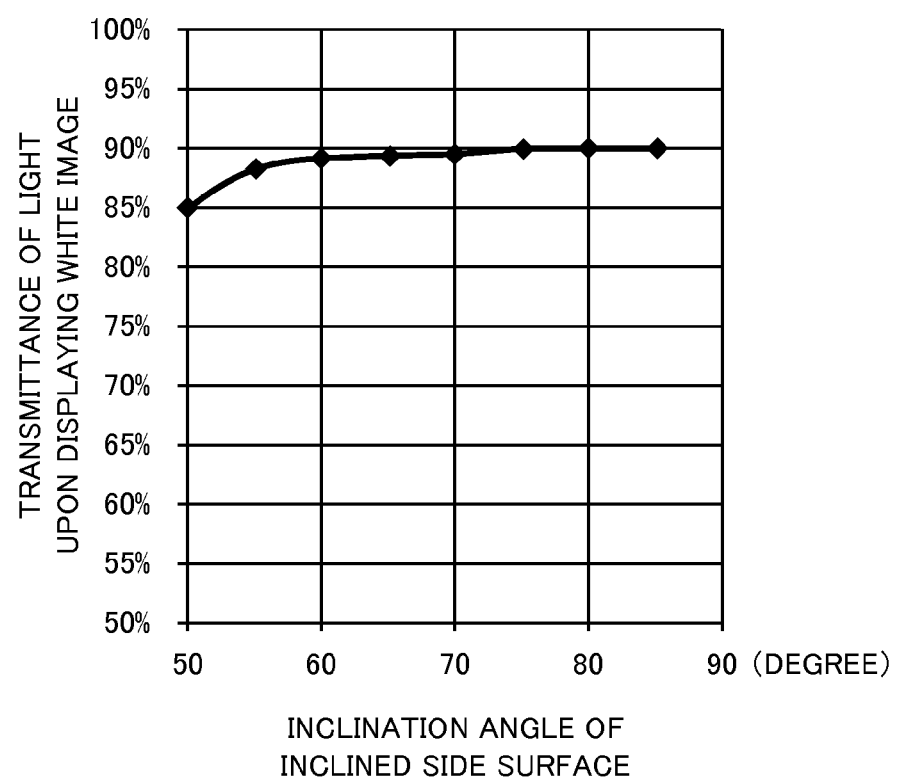
FIG. 7 is a graph illustrating a relationship between the transmittance of light at the time of displaying a white image, and an inclination angle of an inclined side surface.

The thickness of the liquid crystal layer 40 is smaller in the vicinity of the inclined side surface A as the inclination angle θa is smaller. As a result, it is conceivable that the liquid crystal molecules hardly rotates in the vicinity of the inclined side surface A, and thus the transmittance of the light at the time of displaying the white image may be reduced. Under the circumstances, plural samples different in the inclination angle θa are manufactured, and then the transmittance of light at the time of displaying the white image is measured in the respective samples. FIG. 7 is a graph illustrating the measurement results. The axis of abscissa represents the inclination angle θa, and the axis of ordinate is the transmittance of light. The light transmittance in FIG. 7 is a light transmittance in which an influence of the light absorbed by the color filters 52 and the polarization plate, and an influence of an aperture ratio of the respective images are removed. When a vibration direction of linear polarization that has been transmitted through the polarization plate provided to the first panel 10 rotates at 90 degrees in the polarization plate provided to the second panel 50 side, the transmittance of the light is assumed as 100%. The measurement method of the inclination angle θa is the same as that at the time of measurement in FIG. 6. Also, in all of the samples, the width of line of the black matrix 53 is set to 5 μm, and a width of the upper surface of the large walls W1 is set to 2 μm.

As illustrated in FIG. 7, when the inclination angle θa of the inclined side surfaces A becomes smaller, the light transmittance at the time of displaying the white image is reduced. In particular, in a range where the inclination angle θa is smaller than 55 degrees, the light transmittance is remarkably reduced. Therefore, it is preferable that the inclination angle θa is equal to or larger than 55 degrees. In a range where the inclination angle θa is equal to or larger than 60 degrees, the light transmittance is kept substantially constant, that is, about 90%. Therefore, it is more preferable that the inclination angle θa is equal to or larger than 60%. That is, a preferable inclination angle θa is larger than an angle (55 degrees in FIG. 7) that is a subtraction result of the angle (60 degrees in FIG. 7) at which the transmittance of the light at the time of displaying the white image becomes constant when the inclination angle gradually increases, minus 5 degrees. A more preferable inclination angle θa is larger than the angle (60 degrees in FIG. 7) at which the transmittance of the light at the time of displaying the white image is substantially constant when the inclination angle gradually increases. According to the measurement results of FIG. 6 and the measurement results of FIG. 7, the preferable inclination angle θa is equal to or larger than 55 degrees, and equal to or smaller than 75 degrees. The further preferable inclination angle θa is equal to or larger than 60 degrees, and equal to or smaller than 70 degrees.

When the inclination angle θa is 55 degree, a width Lw (refer to FIG. 2) of the lower portion of the large wall W1 is 7.0 μm. Since the width of line of the black matrix 53 is 5.0 μm, the lower portion of the large wall W1 spreads beyond both edges of the black matrix 53 by 1 μm when the inclination angle θa is 55 degrees. However, according to the measurement result of FIG. 7, it is found that when the inclination angle θa is equal to or larger than 55 degrees or higher, the relatively excellent light transmittance can be obtained at the time of displaying the white image. That is, it is preferable that the width Lw of the lower portion of the large wall W1 satisfies the following Expression (1).

$$0 < Lw < Bw+2 \text{ μm} \qquad \text{Ex. (1)}$$

where Bw is a width of line of the black matrix 53.

Figure 8:
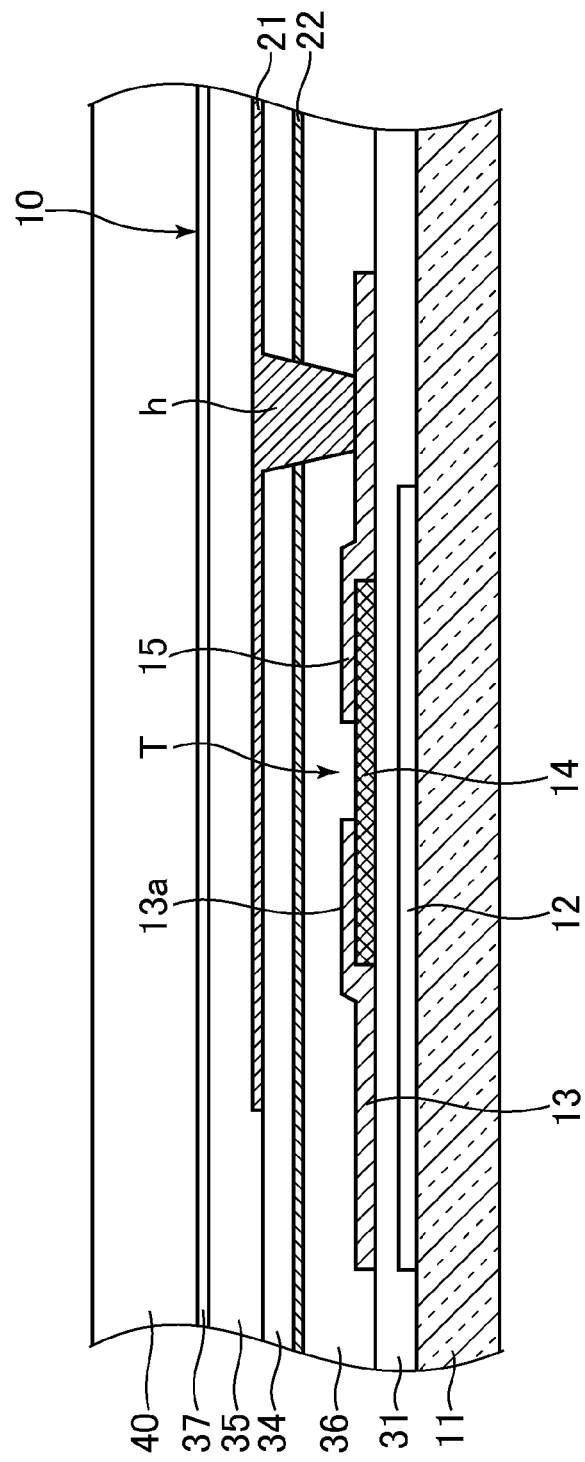
FIG. 8 is a cross-sectional view of the liquid crystal display device taken along a line VIII-VIII illustrated in FIG. 1.

FIG. 8 is a cross-sectional view of the liquid crystal display device 1 taken along a line VIII-VIII illustrated in FIG. 1. FIG. 8 illustrates the thin film transistors T. In FIG. 8, the second panel 50 is omitted.

As illustrated in FIGS. 1 and 8, the gate electrode lines 12 are formed on the first panel 10. The gate electrode lines 12 are covered with the gate insulating film 31. The above-mentioned drain electrode lines 13 and a semiconductor layer 14 are formed on the insulating film 31. A drain electrode 13a connected to the drain electrode lines 13, and a source electrode 15 are formed on the semiconductor layer 14. An insulating film 36 that covers the semiconductor layer 14, the drain electrode lines 13, the drain electrode 13a, and a source electrode 15 are formed over the insulating film 31. A common electrode 22 is formed on the insulating film 36. An insulating film 34 is formed on the common electrode 22. Pixel electrodes 21 are formed on the insulating film 34. The pixel electrodes 21 are connected to the source electrode 15 through a through-hole h formed in the insulating film 34, the common electrode 22, and the insulating film 36.

As described above, the large wall W1 of the first panel 10 includes the inclined side surfaces A on which an alignment film 37 is formed. With this configuration, the light leakage in the vicinity of the large walls W1 can be reduced.

The present invention is not limited to the above-mentioned liquid crystal display device 1, but can be variously changed.

Each of FIGS. 9 to 14 is a cross-sectional view illustrating another example of the present invention. In those figures, the same parts as those described with reference to FIG. 2 are denoted by identical symbols. In the following description, differences from the example of FIG. 2 may be mainly described. Parts not described are identical with those in the example of FIG. 2. In those drawings, a structure including the insulating film 36 and lower than insulating film 36, and a structure of an upper side of the black matrix 53 will be omitted.

Figure 9:
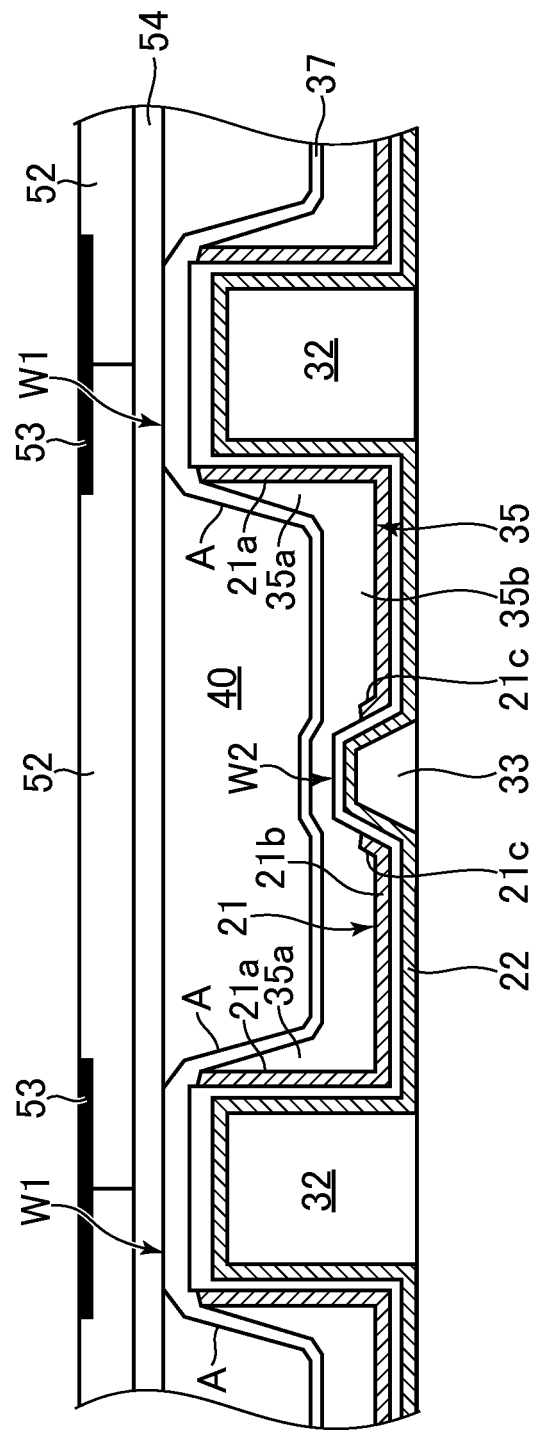
FIG. 9 is a cross-sectional view illustrating another example of the liquid crystal display device according to the present invention.

In an example of FIG. 9, the insulating film 35 is replaced with an insulating film 135. The insulating film 135 has no upper surface part 35c that covers the upper side of the large insulating wall 32. According to this structure, as compared with the structure in which the upper surface part 35c is formed, the height of the large wall W1 can increase. That is, the height of the wall electrode part 21a of the pixel electrodes 21 can increase. As a result, the horizontal electric field is liable to be developed in the liquid crystal layer 40. The insulating film 135 can be formed by removing the upper surface part 35c through photolithography. In the example of FIG. 9, the pixel electrodes 21 each have a side electrode part 21c covering a lower portion of the side surface of the small wall W2.

Figure 10:
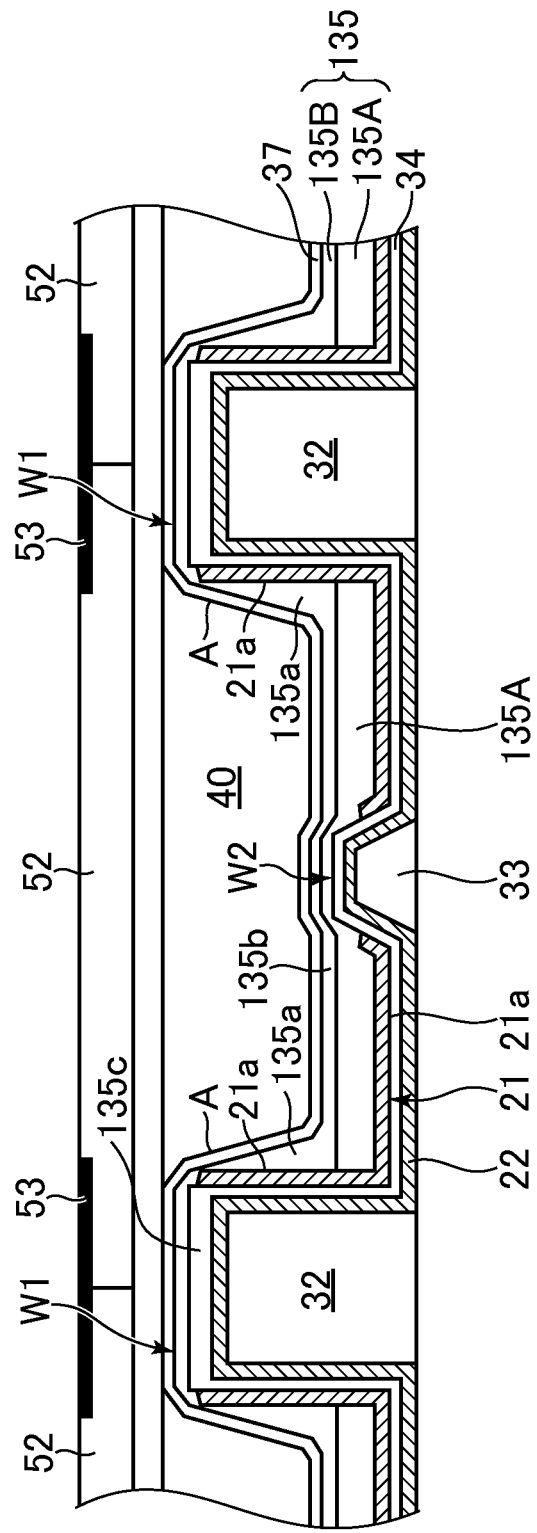
FIG. 10 is a cross-sectional view illustrating still another example of the liquid crystal display device according to the present invention.

In an example of FIG. 10, the insulating film 135 includes a double layer structure including a first insulating film 135A and a second insulating film 135B. The first insulating film 135A is formed between the two opposed large walls W1. The first insulating film 135A is not formed to cover the large insulating wall 32. On the other hand, the second insulating film 135B is formed on the first insulating film 135A, and also covers the large insulating wall 32. That is, the second insulating film 135B includes a side surface part 135a (side insulating part) covering the wall electrode part 21a, an upper surface part 135c covering an upper side of the large insulating wall 32, and a flat part 135b formed on the first insulating film 135A. A surface of the first insulating film 135A is inclined with respect to the direction perpendicular to the first panel 10 and the second panel 50, to thereby obtain the inclined side surfaces A. A liquid solution of a material of the first insulating film 135A is adjusted in concentration so as to be lower in viscosity than a liquid solution of a material of the second insulating film 135B. According to the double layer structure, a thickness (in detail, a sum of the thickness of the first insulating film 135A and the thickness of the flat part 135b) of the insulating film 135 can be easily ensured between the two large walls W1 while reducing the thickness of the upper surface part 135c configuring the upper surface of the large wall W1. A portion of the first insulating film 135A, which is located on the upper side of the large insulating wall 32, is removed through photolithography in the process of manufacturing the first panel 10.

Figure 11:
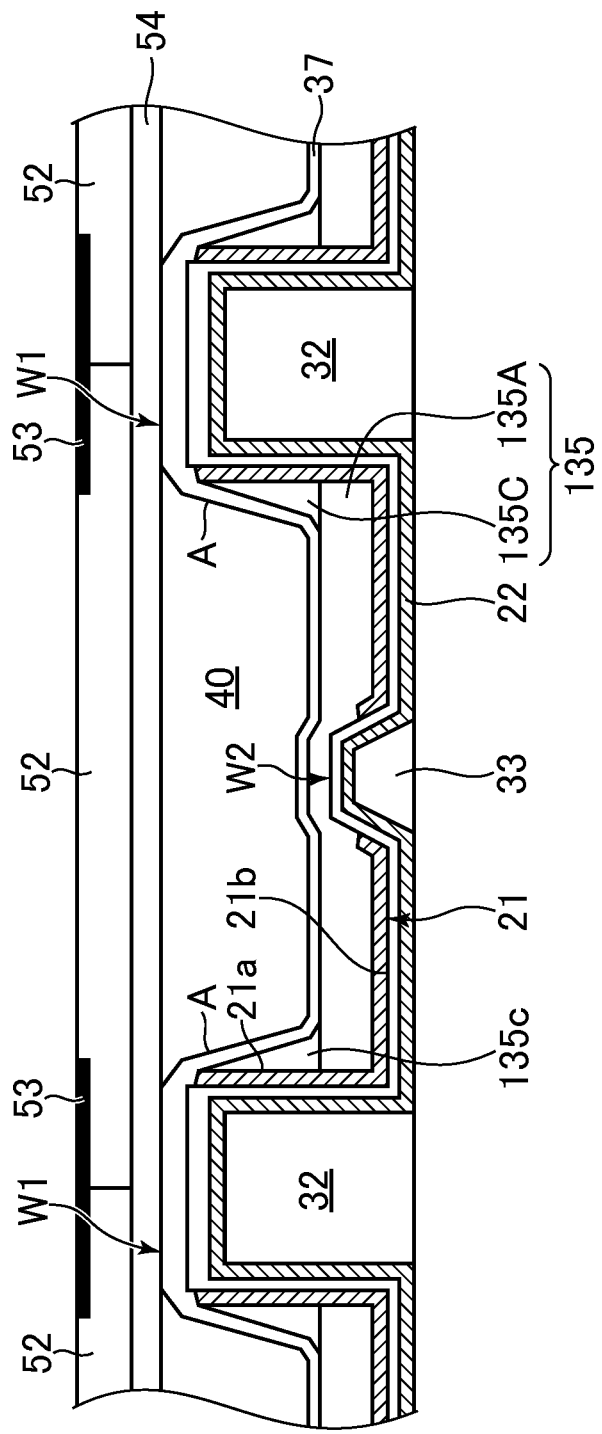
FIG. 11 is a cross-sectional view illustrating yet another example of the liquid crystal display device according to the present invention.

In an example of FIG. 11, the second insulating film 135B of FIG. 10 is replaced with an insulating part 135C. The insulating part 135C corresponds to the above-described side surface part 135a. That is, the insulating part 135C is formed to cover the wall electrode part 21a, and a surface of the insulating part 135C is inclined with respect to the direction perpendicular to the substrates 10 and 20. The insulating part 135C does not include a portion that covers the upper side of the large insulating wall 32, and a portion that covers the small wall W2. According to this structure, since the height of the large wall W1, that is, the height of the wall electrode part 21a can increase, the horizontal electric field can be easily developed in the liquid crystal layer 40. In a process of forming the insulating part 135C, a portion (a portion corresponding to the upper surface part 135c) on the upper side of the large insulating wall 32, and a portion on the upper side of the small wall W2 are removed through photolithography.

Figure 12:
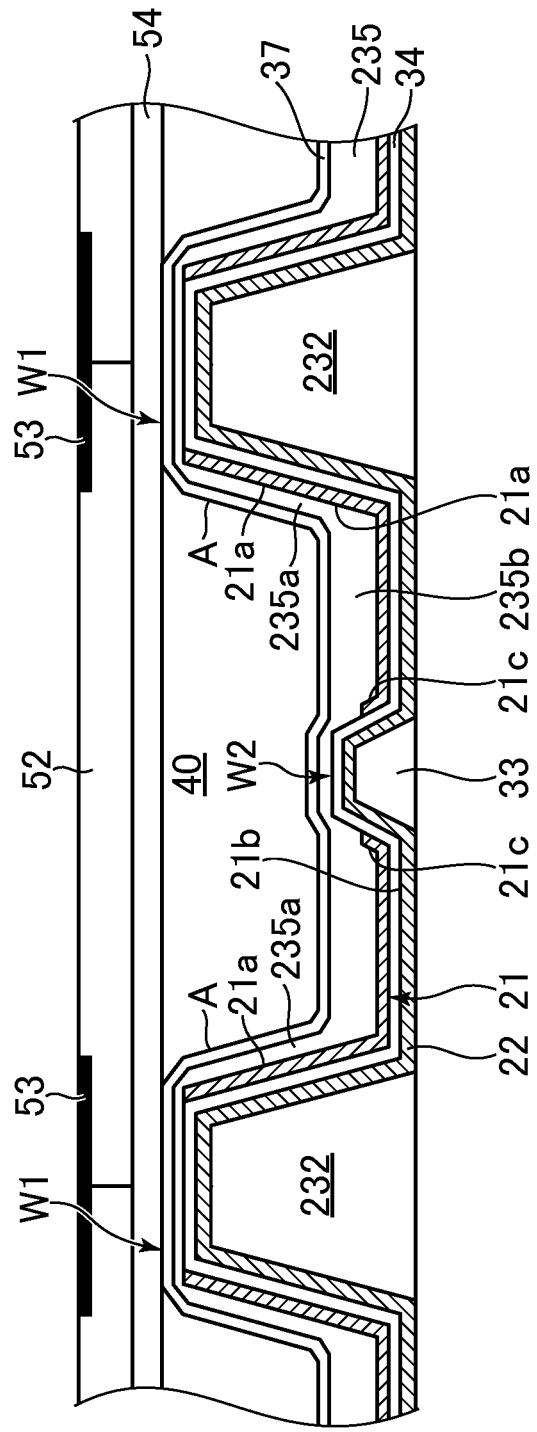
FIG. 12 is a cross-sectional view illustrating a further example of the liquid crystal display device according to the present invention.

In an example of FIG. 12, the above-mentioned large insulating wall 32 is replaced with a large insulating wall 232. A width (a width in a direction along which the two large insulating walls 232 face each other) of the large insulating wall 232 gradually increases toward the substrate 11 of the first panel 10. In other words, the large insulating wall 232 has a substantially trapezoidal cross-section. The side surface of the large insulating wall 232 is inclined. The common electrode 22 and the insulating film 34 are formed to cover the upper surface and the side surface of the large insulating wall 232. The wall electrode part 21a of the pixel electrode 21 is formed to cover the inclined side surface. With the provision of the side surface, the side surfaces A of the large wall W1 is inclined.

An insulating film 235 corresponding to the insulating film 35 in FIG. 2 is formed on the pixel electrode 21, and covers the upper surface and the side surface of the large insulating wall 232. The insulating film 235 includes an upper surface part 235c that covers an upper side of the large insulating wall 232, a side surface part 235a (side insulating part) covering a side surface of the large insulating wall 232, and a flat part 235c covering the horizontal electrode part 21b. The side surface part 235a is formed to cover the inclined side surface of the large insulating wall 232, and a thickness of the side surface part 235a gradually increases toward the substrate 11 of the first panel 10. According to this structure, as compared with the structure of FIG. 2 in which the side surface of the large insulating wall 232 is substantially vertical, the inclination angle θa of the inclined side surfaces A is relatively easily reduced. The thickness of the side surface part 235a may not always gradually increase toward the substrate 11. The large insulating wall 232 can be formed by, for example, diagonal exposure where a material of the large insulating wall 232, or a resist for forming the large insulating wall 232 is diagonally irradiated with light.

Figure 13:
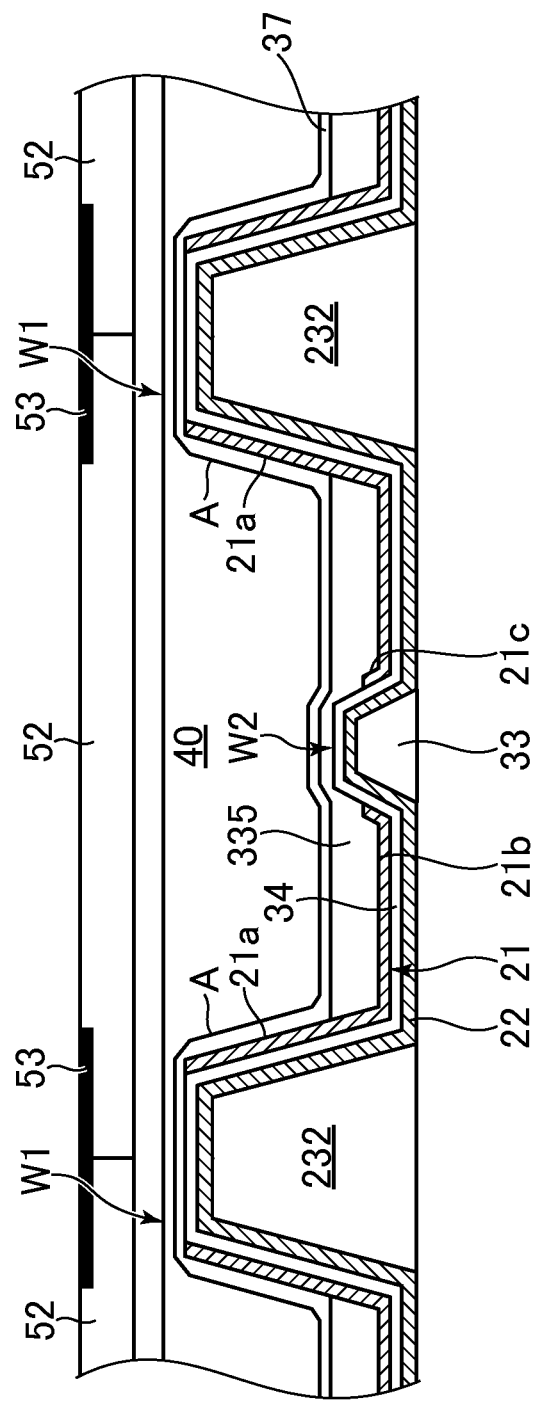
FIG. 13 is a cross-sectional view illustrating a still further example of the liquid crystal display device according to the present invention.

An example of FIG. 13 is substantially the same as the example of FIG. 12, but is different in the insulating film 235 from the example of FIG. 12. The example of FIG. 13 includes an insulating film 335 corresponding to the insulating film 235. The insulating film 335 is formed between the two large walls W1, but is not formed to cover the side surface and the upper surface of the large insulating wall 232 of the large wall W1. The alignment film 37 is formed on the insulating film 335, and also covers the upper side of the large insulating wall 232. Also, the alignment film 37 has a portion formed to cover the side surface of the large insulating wall 232, and this portion is formed on the wall electrode part 21a. As described above, because the side surface of the large insulating wall 232 is inclined, the side surfaces A of the large wall W1 configured by the alignment film 37 is inclined. According to this structure, since the height of the large walls W1 can increase, the horizontal electric field can be easily developed in the liquid crystal layer 40. A portion of insulating film 335 above the upper side of the large insulating wall 32, and a portion of the insulating film 335 covering the side surface of the large insulating wall 32 are removed through photolithography in the forming process.

Figure 14:
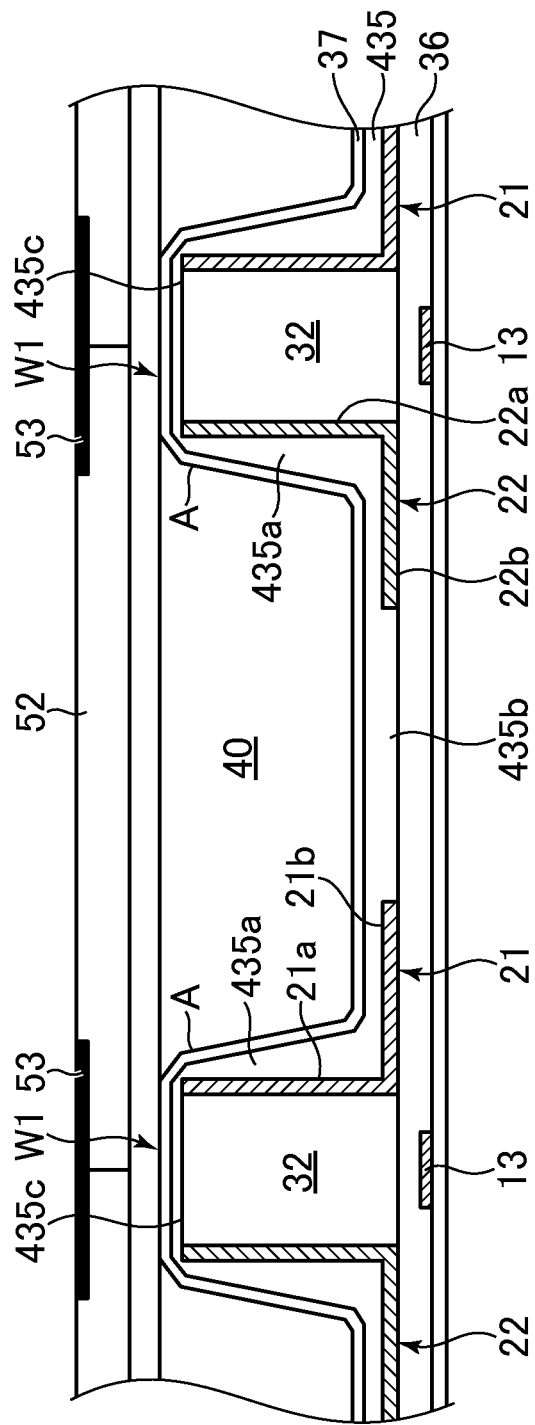
FIG. 14 is a cross-sectional view illustrating a yet further example of the liquid crystal display device according to the present invention.

In the above description, the wall electrode parts 21a of the pixel electrodes 21 are formed on both of the side surfaces of the two opposed large walls W1. However, the wall electrode of the pixel electrode 21 may be formed on one of the large walls W1, and the wall electrode of the common electrode may be formed on the other large wall W1. FIG. 14 is a cross-sectional view illustrating the liquid crystal according to this configuration.

The first panel 10 includes the large insulating wall 32. The wall electrode part 21a of the pixel electrode 21 is formed on one side surface of the large insulating wall 32. A wall electrode part 22a of the common electrode 22 is formed on the other side surface of the large insulating wall 32. Therefore, the wall electrode part 21a of the pixel electrodes 21 and the wall electrode part 22a of the common electrode 22 face each other across the center of one pixel. The common electrode 22 includes the wall electrode part 22a, and a horizontal electrode part 22b formed on the insulating film 36. Also, the pixel electrodes 21 includes the horizontal electrode part 21b formed on the insulating film 36. In the example of FIG. 14, the above-mentioned small wall W2 is not formed.

According to this structure, since the movement of liquid crystal molecules is uniformized between the two large walls W1, the transmittance of light at the time of displaying the white image can increase.

The electrodes 21 and 22 are covered with an insulating film 435. The insulating film 435 has side surface parts 435a (side insulating parts) covering the wall electrode parts 21a and 22b. A thickness of each side surface part 435a gradually increases toward the substrate 11 of the first panel 10 as in the side surface part 35a of insulating film 35 described above. Therefore, a surface of the side surface part 435a is inclined with respect to the direction perpendicular to the first panel 10 and the second panel 50. The alignment film 37 covers the side surface parts 435a, and configures the inclined side surfaces A of the large walls W1. In the example of FIG. 14, the large insulating wall 32 may have a trapezoidal cross-section as in the examples of FIGS. 12 and 13. The insulating film 435 illustrated in FIG. 14 includes flat parts 435b formed on the horizontal electrode parts 21b and 22b, and an upper surface part 435c that covers the upper side of the large insulating wall 32. The insulating film 435 may not always have the upper surface part 435c.

Each pixel of the liquid crystal display device 1 may include a multi-domain structure. That is, each of the pixels may have two areas which is divided in an extension direction of the drain electrode line 13. And then a direction of the initial alignment of the liquid crystal molecules in one area may be inclined with respect to a direction of the initial alignment of the liquid crystal molecules in the other area.

In the example of FIG. 2, the wall electrode part 21a of the large wall W1 functions as a pixel electrode. However, the wall electrode part 21a that functions as the common electrode may be formed on the large wall W1. In an example of this structure, the common electrode has the horizontal electrode part 21b between the two large walls W1, and the slit S is formed in the horizontal electrode part 21b. The pixel electrode is formed on the small insulating wall 33, and exposed toward the liquid crystal layer 40 through the slit S.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a first panel having pixel electrodes disposed in a plurality of pixels respectively, and a common electrode;
   a second panel facing the first panel and having a black matrix which partitions two adjacent pixels;
   a liquid crystal layer disposed between the first panel and the second panel; and
   a wall including
      an insulating wall made of an insulating material, formed in the first panel, and located in a boundary between two adjacent pixels,
      a wall electrode which is provided along a first side surface of the insulating wall and functions as the pixel electrode or the common electrode, and
      an alignment film formed on a second side surface of the wall and provided over the wall electrode, the alignment film defining an alignment of liquid crystal molecules included in the liquid crystal layer,
   wherein the side surface of the wall on which the alignment film is formed is inclined with respect to a direction perpendicular to the first panel and the second panel, and
   wherein a first angle formed between the second side surface and a substrate of the first panel is smaller than a second angle formed between the first side surface and the substrate of the first panel, wherein the first side surface is formed on one side of a right side or a left side of the insulating wall, and the second side surface is formed on the one side of the right side or the left side of the insulating wall.

2. The liquid crystal display device according to claim 1, wherein the wall includes a side insulating part made of an insulating material and covering the wall electrode, wherein a surface of the side insulating part is inclined with respect to the direction perpendicular to the first panel and the second panel, and
   wherein the alignment film is formed on the surface of the side insulating part.

3. The liquid crystal display device according to claim 1, wherein the side surface of the insulating wall is inclined with respect to the direction perpendicular to the first panel and the second panel.

4. The liquid crystal display device according to claim 1, wherein the wall includes a lower part which is a portion in the wall located toward the substrate of the first panel, and
   wherein the lower part of the wall has a width larger than a width of a line of the black matrix.

5. The liquid crystal display device according to claim 2, wherein the insulating material of the side insulating part is connected from one of the two adjacent pixels to the other through an upper surface of the wall.

6. The liquid crystal display device according to claim 1, wherein the first panel includes, as the insulating wall, two large insulating walls facing each other across one pixel, and the first panel includes a small insulating wall that is formed between the two large insulating walls and is lower in height than the two large insulating walls,
   wherein one of the pixel electrode and the common electrode covers the side surfaces of the large insulating walls as the wall electrode, and wherein the other of the pixel electrode and the common electrode is formed on the small insulating wall.

7. The liquid crystal display device according to claim 1,
wherein one of the pixel electrode and the common electrode covers the side surface of one of the two insulating walls that face each other, and
wherein the other of the pixel electrode and the common electrode covers the side surface of the other of the two insulating walls.

\* \* \* \* \*